United States Patent
Heau et al.

(10) Patent No.: US 11,624,339 B2
(45) Date of Patent: Apr. 11, 2023

(54) AIRCRAFT TURBOJET ENGINE NACELLE, PROPULSION UNIT AND AIRCRAFT INCLUDING SUCH A NACELLE

(71) Applicant: Safran Nacelles, Gonfreville l'Orcher (FR)

(72) Inventors: Alexis Heau, Gonfreville l'Orcher (FR); Laurent Georges Valleroy, Gonfreville l'Orcher (FR); Goulwen Lansonneur, Gonfreville l'Orcher (FR)

(73) Assignee: Safran Nacelles, Gonfreville l'Orcher (FR)

( * ) Notice: Subject to any disclaimer, the term of this patent is extended or adjusted under 35 U.S.C. 154(b) by 220 days.

(21) Appl. No.: 16/421,519

(22) Filed: May 24, 2019

(65) Prior Publication Data
US 2019/0316545 A1    Oct. 17, 2019

Related U.S. Application Data (63) Continuation of application No. PCT/FR2017/053283, filed on Nov. 29, 2017.

(30) Foreign Application Priority Data

Nov. 30, 2016  (FR) .................................. 1661712

(51) Int. Cl.
*F02K 1/72*  (2006.01)
*B64D 29/06*  (2006.01)

(52) U.S. Cl.
CPC ................ *F02K 1/72* (2013.01); *B64D 29/06* (2013.01)

(58) Field of Classification Search
CPC ... F02K 1/72; F02K 1/80; F02K 1/625; B64D 29/06
See application file for complete search history.

(56) References Cited

U.S. PATENT DOCUMENTS

| | | | | |
|---|---|---|---|---|
| 3,280,562 A | * | 10/1966 | Theits | F02K 1/72 60/229 |
| 3,829,020 A | * | 8/1974 | Stearns | F02K 1/827 239/265.13 |
| 5,154,052 A | * | 10/1992 | Giffin, III | F02K 1/62 60/262 |

(Continued)

FOREIGN PATENT DOCUMENTS

WO    2016116709    7/2016

OTHER PUBLICATIONS

International Search Report for International Application PCT/FR2017/053283, dated Feb. 5, 2018.

*Primary Examiner* — Andrew H Nguyen
(74) *Attorney, Agent, or Firm* — Burris Law, PLLC (57) ABSTRACT

An aircraft turbojet engine nacelle includes a rear section without a lower bifurcation, the rear section including a thrust reverser system, and the thrust reverser system including a movable cowl. The nacelle includes a guide system including a movable portion and a fixed portion, the movable portion being secured in translation to the movable cowl and cooperating with the fixed portion and the fixed portion being fixed relative to the nacelle. The guide system is disposed proximate to a position called the "6 O'clock" position. In one form, the length of the fixed portion of the guide system is larger than or equal to 50% of the length of the movable portion.

14 Claims, 7 Drawing Sheets

(56) References Cited

U.S. PATENT DOCUMENTS

| | | | |
|---|---|---|---|
| 7,484,356 B1* | 2/2009 | Lair | F02K 1/72 60/226.2 |
| 9,328,694 B2* | 5/2016 | Todorovic | F02K 1/763 |
| 2002/0125370 A1 | 9/2002 | Dehu et al. | |
| 2009/0107108 A1* | 4/2009 | Vauchel | F02K 1/72 60/226.2 |
| 2010/0001123 A1* | 1/2010 | Hillereau | F02K 1/72 244/54 |
| 2011/0277448 A1* | 11/2011 | Roberts | F02K 1/625 60/226.2 |
| 2011/0293414 A1* | 12/2011 | Soulier | B64D 29/06 415/214.1 |
| 2011/0318173 A1 | 12/2011 | Ramlaoui et al. | |
| 2012/0217320 A1* | 8/2012 | Vauchel | F01D 25/28 239/265.19 |
| 2013/0062433 A1* | 3/2013 | Vauchel | F02K 1/766 239/265.19 |
| 2014/0116026 A1* | 5/2014 | Todorovic | F02K 1/72 60/226.2 |

\* cited by examiner

AIRCRAFT TURBOJET ENGINE NACELLE, PROPULSION UNIT AND AIRCRAFT INCLUDING SUCH A NACELLE

CROSS-REFERENCE TO RELATED APPLICATIONS

This application is a continuation of International Application No. PCT/FR2017/053283, filed on Nov. 29, 2017, which claims priority to and the benefit of FR 16/61712 filed on Nov. 30, 2016. The disclosures of the above applications are incorporated herein by reference.

FIELD

The present disclosure relates to a turbojet engine nacelle, a propulsion unit equipped with such a nacelle, as well as an aircraft provided with such a propulsion unit.

BACKGROUND

The statements in this section merely provide background information related to the present disclosure and may not constitute prior art.

An aircraft is generally propelled by several turbojet engines each housed in a nacelle, each nacelle further accommodating a set of auxiliary actuation devices related to its operation and ensuring various functions when the turbojet engine is in operation or stopped.

Civil aircraft nacelles are generally intended to accommodate a bypass turbojet engine, adapted to generate via the blades of the rotating fan, a flow of hot gases (also called primary flow) and a cold air flow (also called secondary flow) which circulates outside the turbojet engine, through an annular passage, also called flow path, formed between two concentric walls of the nacelle. The primary and secondary flows are ejected from the turbojet engine at the rear of the nacelle. The nacelles generally also include:

an air inlet, located upstream of the turbojet engine;
a middle section intended to surround a fan casing of the turbojet engine;
a rear section, including an inner structure intended to surround the gas generator, that is to say the combustion chamber of the turbojet engine, the high pressure compressor and the turbine stages (low and high pressure), and an outer structure which defines, together with the inner structure, the secondary flow path for channeling the cold air flow, the rear section which can embed thrust reversal elements; and
an ejection nozzle, whose outlet is located downstream of the turbojet engine.

The thrust reversal elements allow, during the landing of an aircraft, improving the braking capability thereof by redirecting forwards a major fraction of the thrust generated by the turbojet engine. In this phase, the thrust reverser generally obstructs the cold flow path and directs said cold flow towards the front of the nacelle, thereby generating a counter-thrust which is added to the braking of the wheels of the aircraft. The means implemented to make this reorientation of the cold flow vary according to the thrust reverser type. A common configuration is that of the thrust reversers called "cascade thrust reversers." In this thrust reverser type, the outer cowl of the rear section is a sliding-type one. The rearward translation of this sliding cowl allows uncovering thrust reverser cascades communicating the cold flow path and the outside of the nacelle. The translation of the sliding cowl further allows deploying blocking flaps in the cold flow path, downstream of the fan. Thus, by the combined action of the blocking flaps and the thrust reverser cascades, the cold flow is redirected towards the front of the nacelle.

As mentioned above, the thrust reversal elements are housed in the rear section of a nacelle. Three structural configuration types are mainly known for the rear section, namely the "C-duct," the "D-duct," and the "O-duct" structures.

In a nacelle with a D-shaped structure, the inner and outer structures of the rear section of the nacelle are connected to each other by two diametrically opposed connection islands, generally called bifurcations. The bifurcations thus form structures passing throughout the secondary flow path, respectively at the level of the positions called "twelve O'clock" positions (upper bifurcation) and "six O'clock" position (lower bifurcation). It will be recalled that the "twelve O'clock" and "six O'clock" positions are conventionally defined by analogy with a watch dial, the nacelle being in the operating position, that is to say under the wing. The "twelve O'clock" position is thus located at the level of the hooking strut of the nacelle, whereas the "six O'clock" position corresponds to the diametrically opposite position.

In a nacelle with an O-shaped or C-shaped structure, the rear section is configured such that a lower bifurcation (or lower connection island) is not required. The outer fixed structure can thus be connected to the inner fixed structure by a single bifurcation, the upper bifurcation located at the level of the "twelve O'clock" position. Such a configuration represents a great gain in efficiency for the propulsion unit since the cold flow path is no longer obstructed in the lower portion thereof, as is the case for the D-shaped structures. In addition, the O-shaped or C-shaped structures also allow significant gains in terms of mass.

In an O-shaped or C-shaped structure, the sliding cowl, or movable cowl, is generally mounted on guide rails disposed on either side of the suspension mast (or strut) of the propulsion unit. These guide rails may be disposed directly on the mast, or on an intermediate element secured to the mast when the propulsion unit is mounted. The movable cowl is generally guided and supported only at the level of these guide rails, therefore only proximate to the "twelve O'clock" position. Moreover, in an O-shaped structure, the sliding cowl forms an integral one-piece structure.

In order to address various constraints (such as avoiding air re-ingestion by the engine, avoiding directing a fraction of the thrust towards the fuselage of the aircraft, etc.), the profile of the cascades ensuring the redirection of the cold flow is generally not uniform along the circumference of the cascades set. It follows that the transverse loads related to the thrust reversal undergone by the cascades are not uniformly distributed. The sum of these transverse loads is non-zero, which generates a transverse force applied on the cascades set and therefore on the propulsion unit. This transverse force generates a rocking movement of the propulsion unit. This non-uniform distribution also generates a non-uniform deformation of the thrust reverser, which is ovalized during the thrust reversal phases. These undesirable deformations and movements constitute particularly major drawbacks in the case of O-shaped or C-shaped structures.

A solution to these drawbacks is known from the application WO 2016/116709. This solution consists in providing a complementary guide system in the position called "six O'clock" position, which allows ensuring a take-up of the transverse loads in the lower portion of the nacelle. The guide system described in the aforementioned application is of the "short" type, that is to say that the gap between the extreme support points of the guided element remains relatively small compared to the guide length ensured by the guide rail. Such a configuration aims at ensuring a sufficient take-up of the transverse loads while limiting the risk of static indeterminacy in the guidance of the movable cowl.

Nonetheless, the device described does not enable correct take-up of some loads, including in particular the moments about the vertical axis and the transverse axis of the nacelle, that is to say the moments about the two axes perpendicular to the longitudinal axis of the nacelle. Yet, these loads may be particularly significant, in particular in some cases of degraded operation of the thrust reverser system, and for example in case of failure of one of the actuators of the movable cowl or in case of a "retention of the tertiary lock" type incident. In the first case, the failure of an actuator may result in the movable cowl undergoing very strong asymmetric loads during the deployment and retraction movements. In this case, the moments about the vertical axis of the nacelle undergone by the thrust reverser system will be particularly considerable. In the second case, the tertiary lock (generally known as TLS standing for "tertiary lock system"), which is located in the "12 O'clock" position, does not release the movable cowl. The movable cowl is thus retained in the retracted position only in the upper portion of the nacelle and is therefore cantilevered with respect to the aerodynamic forces undergone thereby. In this second case, the moments about the transverse axis of the nacelle undergone by the thrust reverser system will be particularly considerable.

SUMMARY

The present disclosure enables proper take-up of forces subjected to the sliding cowl and the thrust reverser cascades in the lower portion of the nacelle.

To this end, the present disclosure relates to an aircraft turbojet engine nacelle, the nacelle including a rear section without a lower bifurcation, the rear section including a thrust reverser system, the thrust reverser system including a movable cowl, the nacelle being characterized in that it includes a guide system including a movable portion and a fixed portion, the movable portion being secured in translation to the movable cowl and cooperating with the fixed portion, the fixed portion being fixed relative to the nacelle, the guide system being disposed proximate to the position called "6 O'clock" position, the length of the fixed portion of the guide system being larger than or equal to 50% of the length of the movable portion.

Thus, by providing a guide system as defined herein, a "long" type six O'clock guidance is carried out, which allows providing a take-up of transverse loads in the lower portion of the nacelle, including moments about the transverse and vertical axes of the nacelle (respectively the Y and Z axes in the figures). Thanks to this configuration, when the thrust reverser system is in the deployed position, the parasitic deformations and movements generated in the "O-duct" or "C-duct" type nacelles are considerably limited and even suppressed. And when the thrust reverser system encounter incidents such as an actuator failure or a "retention of the tertiary lock" type incident, the moments about the axes Y, Z orthogonal to the longitudinal axis X of the nacelle will be correctly taken-up, which is not the case of the nacelle of the application WO 2016/116709. Furthermore, the guide system in accordance with the present disclosure is simply integrated in the nacelle because the movable portion of the guide system is advantageously inserted in place of a solid cascade, for example one that is normally positioned at six O'clock (generally called "blank off").

In one form, the length of the fixed portion of the guide system is larger than or equal to 80% of the length of the movable portion.

In another form, the fixed portion forms a rail cooperating with the movable portion, the movable portion forming a guideway and including a cavity capable of receiving the fixed portion.

In another form, the fixed portion is secured to a peripheral frame intended to be fastened to the fan casing of a turbojet engine, and/or intended to be directly fastened to the fan casing.

In yet another form, the fixed portion includes at least two fastening points.

In still another form, the thrust reverser system includes thrust reverser cascades, in particular sliding thrust reverser cascades.

In a further form, the thrust reverser cascades are sliding-type ones, a front end of the movable portion being secured to a front peripheral frame secured to the thrust reverser cascades.

In another form, the movable portion is disposed between two thrust reverser cascades.

In another form, the movable portion is disposed at the location normally occupied by a cascade called solid cascade.

In yet another form, the movable portion is secured to the front peripheral frame.

In still another form, a rear end of the movable portion is secured to a peripheral frame of the movable cowl.

In another form, the movable portion is extended by a beam secured to the movable cowl.

The present disclosure also concerns an aircraft propulsion unit, including a bypass turbojet engine, the propulsion unit including a nacelle as defined hereinabove.

Finally, the present disclosure relates to an aircraft including at least one propulsion unit as defined hereinabove, the propulsion unit being supported by a mast, the aircraft including rails for guiding the movable cowl of the nacelle, the guide rails being fastened on the mast, or on a structure secured to at least one of the mast and the turbojet engine.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 3a is a detailed view of FIG. 2a;

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1A:
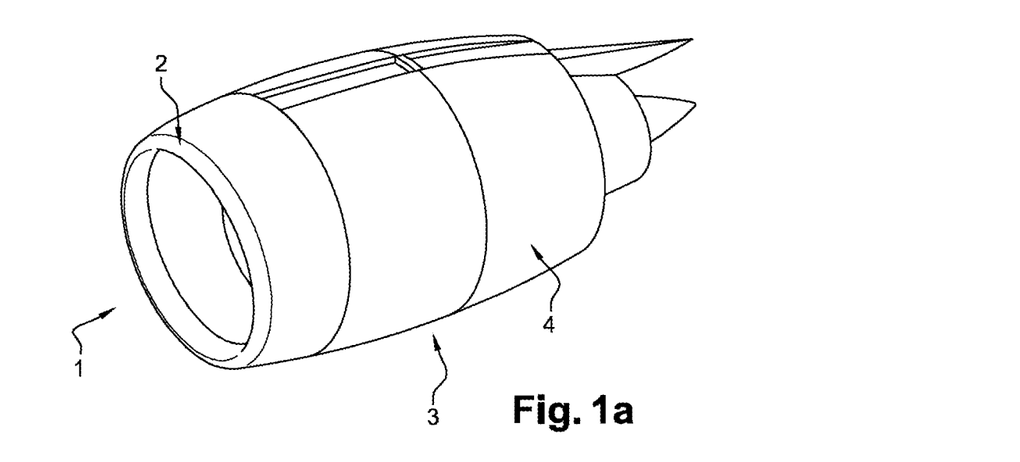
FIG. 1a represents a nacelle in a "direct jet" configuration according to the present disclosure.
Figure 1B:
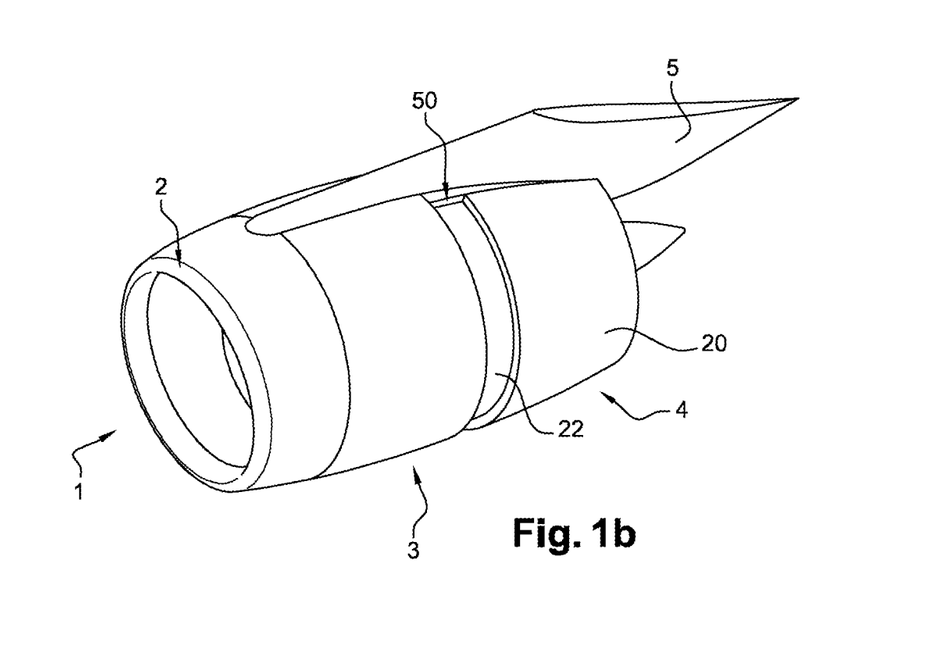
FIG. 1b represents a nacelle in a "reverse jet" configuration according to the present disclosure.

FIGS. 1a and 1b show a view of a nacelle 1 in accordance with the present disclosure. This conventionally includes an air inlet 2, a middle section 3, as well as a rear section 4. In FIG. 1a, the nacelle 1 is represented alone, while in FIG. 1b, there is shown the nacelle 1 mounted on a mast 5 (also known as "reactor strut" or a pylon). Moreover, FIG. 1a shows the nacelle in the "direct jet" configuration, that is to say with the thrust reverser system in the retracted position, whereas FIG. 1b shows the nacelle in the "reverse jet" configuration, that is to say with the thrust reverser system in the deployed position. Thus, it is shown in FIG. 1b that a movable cowl 20 of the rear section 4 is in the retracted position, revealing a set of thrust reverser cascades 22. In the example, the movement of the movable cowl 20 is supported and guided by rails 50 disposed on either side of the mast 5.

In the example, the structure of the nacelle is of an "O-duct" type and therefore does not include a bifurcation (or connection island) in the lower portion of the cold flow path. It should be noted that the present disclosure is also applicable to a nacelle with a c-shaped structure.

Figure 2A:
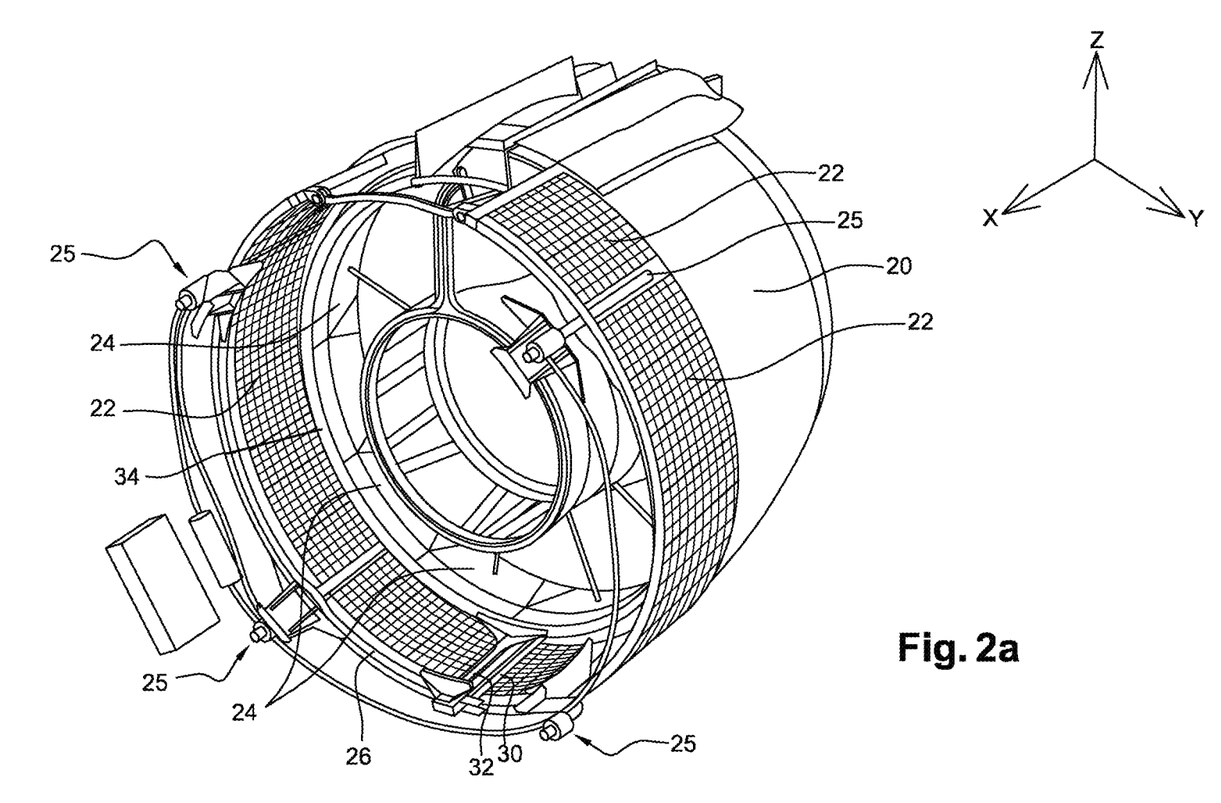
FIG. 2a is a partial view of the rear section of the nacelle of FIGS. 1a and 1b with the thrust reverser system in the retracted position.
Figure 2B:
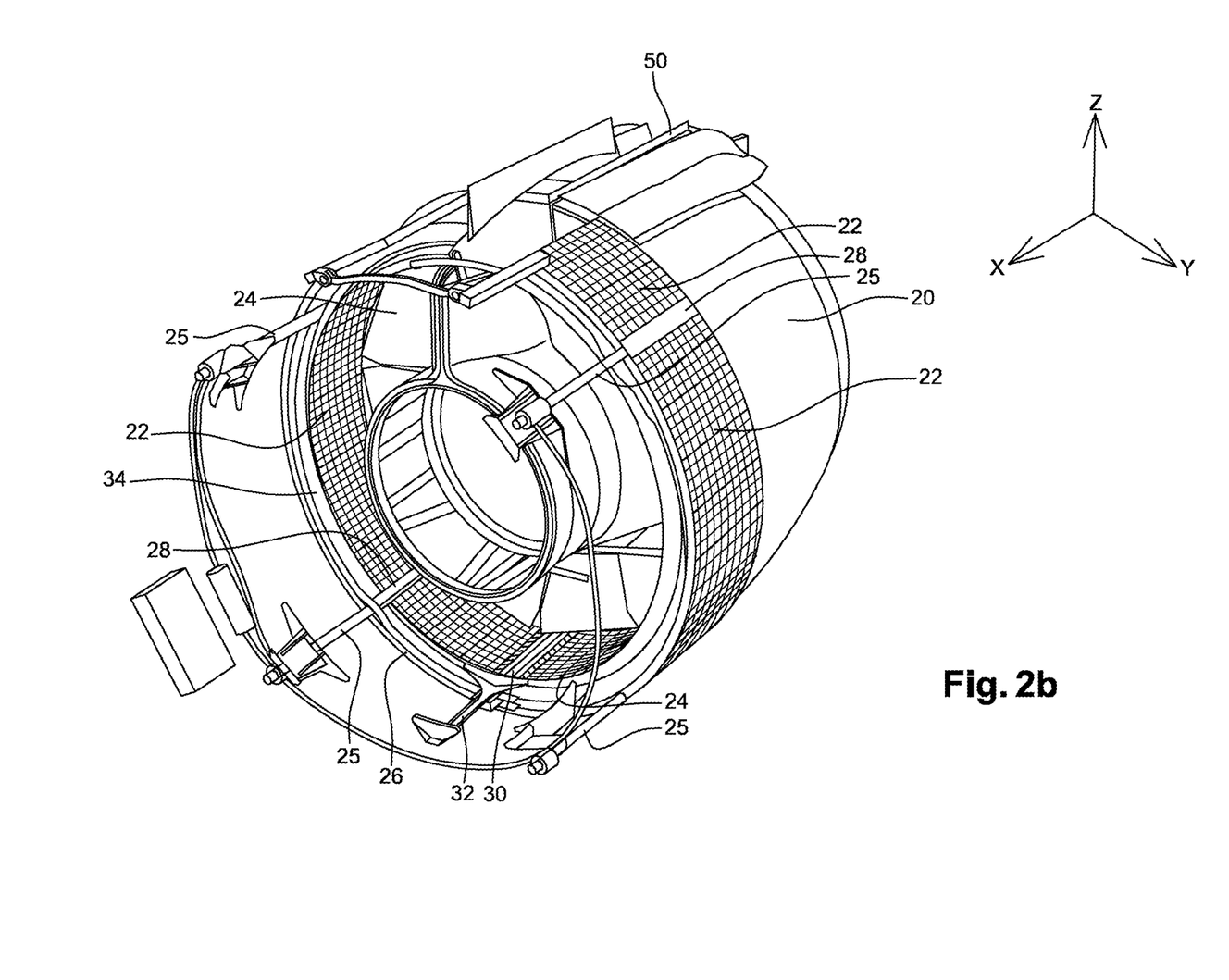
FIG. 2b is a partial view of the rear section of the nacelle of FIGS. 1a and 1b with the thrust reverser system in the deployed position.

FIGS. 2a and 2b represent a portion of the rear section of the nacelle of FIGS. 1a and 1b, showing in particular the components of the thrust reverser system, respectively in the retracted position and in the deployed position.

The thrust reverser system comprises a movable cowl 20, in the example in one-piece, which forms the external surface of the rear section of the nacelle. The movable cowl 20 is slidably mounted, in the example via the rails 50, secured to the mast 5 supporting the propulsion unit (namely the assembly formed by a turbojet engine and the associated nacelle). The thrust reverser system further comprises thrust reverser cascades 22, in the example sliding cascades, and blocking flaps 24 movable in rotation. The thrust reverser system includes actuators 25, in particular electromechanical actuators, allowing making the movable cowl slide between its retracted position (FIG. 2a) and its deployed position (FIG. 2b), and vice versa.

When the thrust reverser system is retracted (FIG. 2a):

the movable cowl 20 is in the retracted position, corresponding to a forward position in which it provides the aerodynamic continuity with the middle section of the nacelle;

the blocking flaps 24 are in the retracted position, a position in which they do not obstruct the cold flow path; and the thrust reverser cascades 22 are in the retracted (or forward) position, a position in which they are disposed around the fan casing of the turbojet engine.

When the thrust reverser system is deployed (FIG. 2b):

the movable cowl is in the deployed position, corresponding to a rearward position, in which it uncovers the thrust reverser cascades 22 which are in their rearward position;

the blocking flaps 24 are in the deployed position, a position in which they at least partially obstruct the cold flow path; and the thrust reverser cascades 22 are in the deployed (or rearward) position, a position in which they are disposed at the rear of the fan casing of the turbojet engine, and in which they redirect the cold flow outwardly and forwardly of the nacelle.

It should be noted that, in the example, the thrust reverser cascades 22 includes sliding cascades, these being linked in translation to the movable cowl 20, and the relative position of the thrust reverser cascades 22 relative to the movable cowl 20 does not vary during the deployment or the retraction of the thrust reverser system.

The thrust reverser cascades 22 are secured to a front peripheral frame 26. Several housings 28 are provided for the actuators of the thrust reverser system. These housings 28, four in the example of the figures, are disposed between some of the thrust reverser cascades 22.

In the "six O'clock" position (or proximate to this position), a guide system is disposed, including a movable portion 30, secured in translation to the movable cowl 20, and a fixed portion 32, secured to a fixed portion of the nacelle and/or secured to the turbojet engine associated to the nacelle.

Advantageously, the movable portion 30 is disposed at the location normally occupied by a cascade called solid cascade (generally known as "blank off"), such a solid cascade being provided to inhibit a redirection of the cold flow downwards. Thus, the movable portion 30 of the guide system is advantageously disposed between two thrust reverser cascades 22, at the rear of the front peripheral frame 26 of the cascades 22.

Figure 3A:
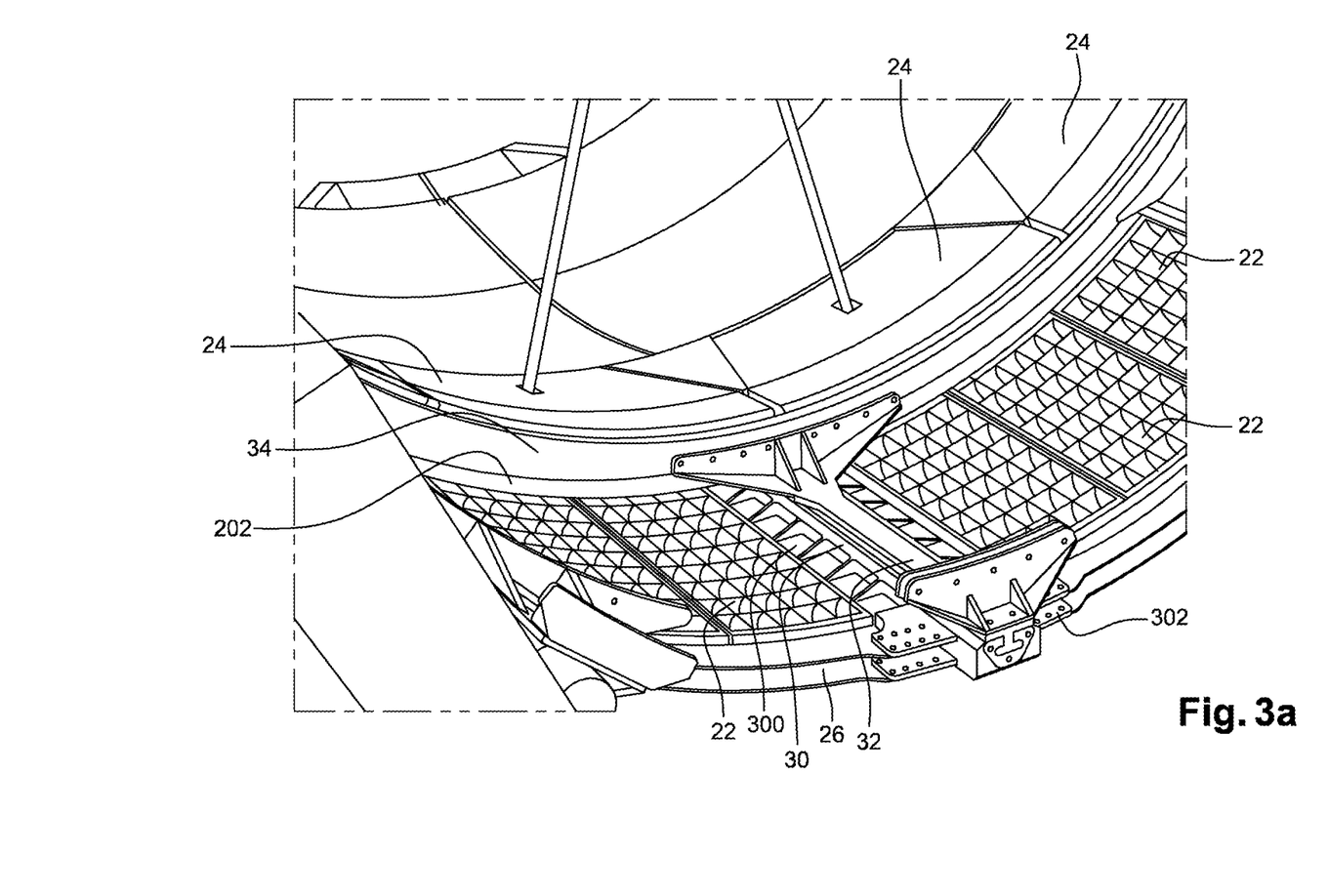
Figure 3B:
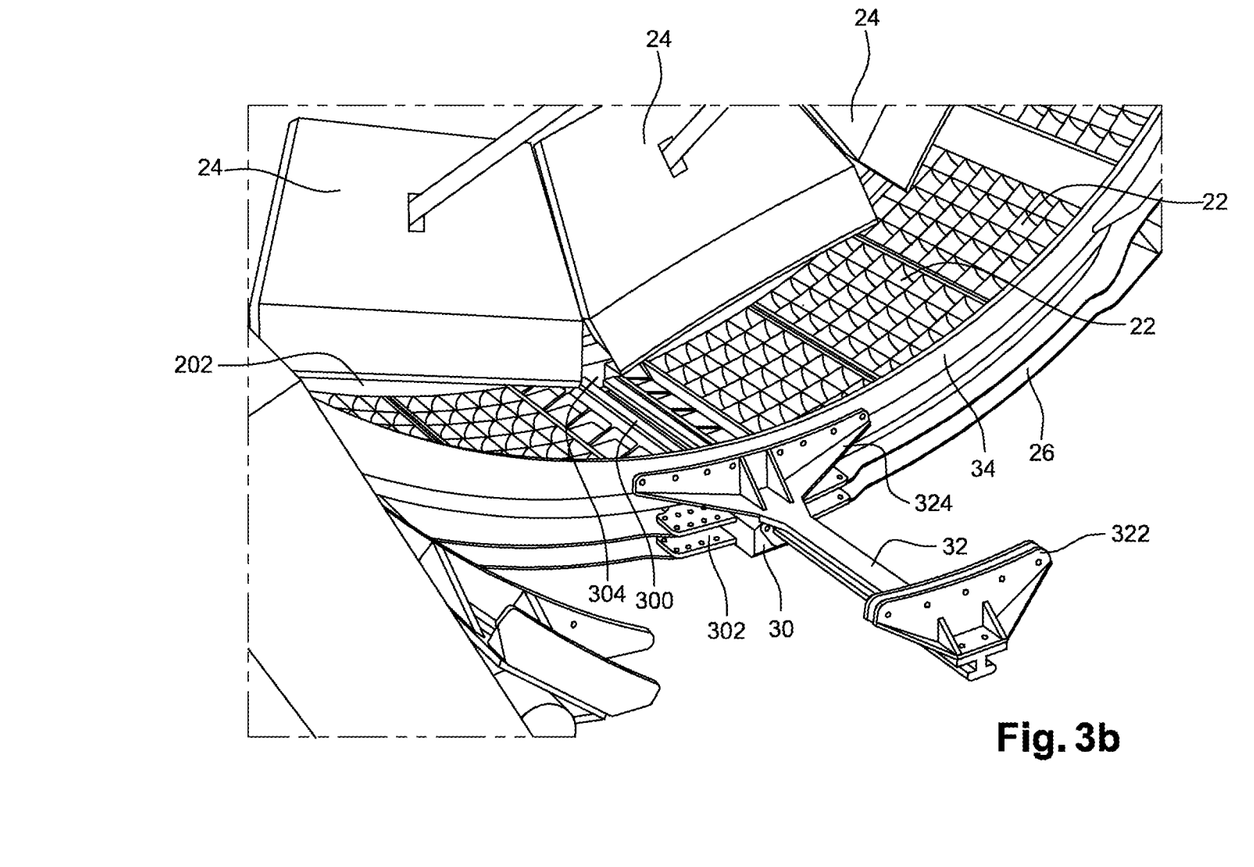
FIG. 3b is a detailed view of FIG. 2b.
Figure 4A:
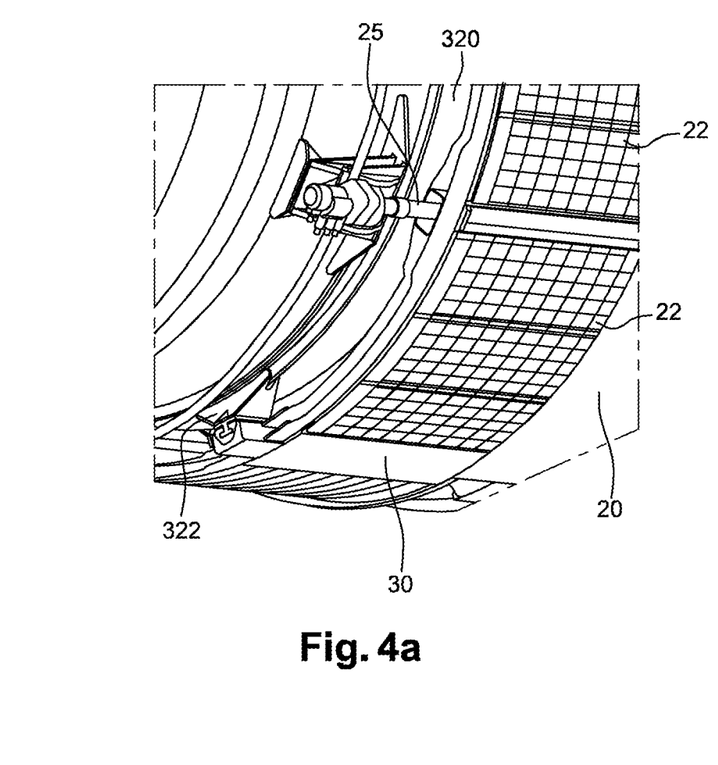
FIG. 4a is a partial view of the nacelle of FIGS. 1a and 1b with the thrust reverser system in the retracted position.
Figure 4B:
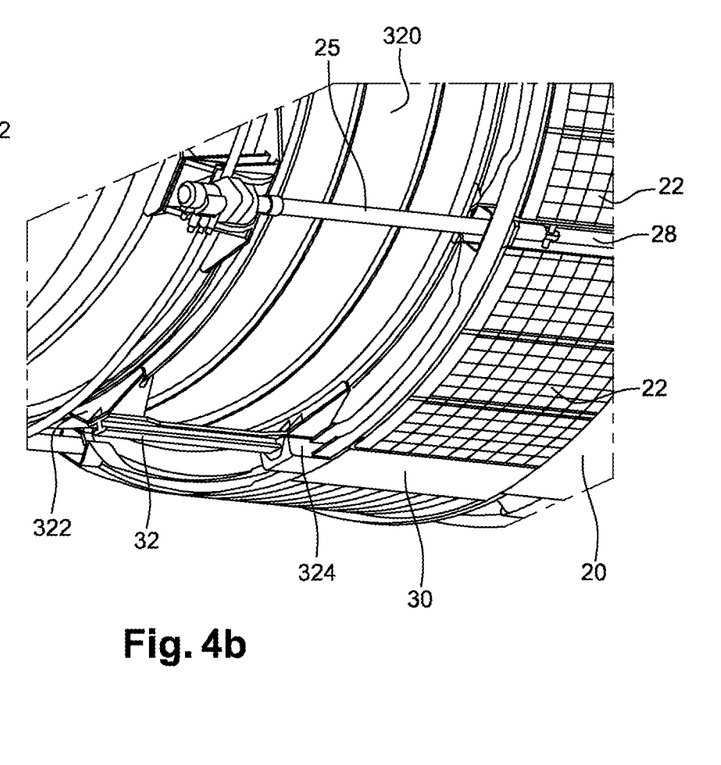
FIG. 4b is a partial view of the nacelle of FIGS. 1a and 1b with the thrust reverser system in the deployed position.

In accordance with the present disclosure, the movable portion 30 of the guide system is fixed relative to the movable cowl 20 (and therefore, in the example, relative to the thrust reverser cascades 22), being in the example fastened to the front peripheral frame 26. The movable portion 30 forms a guideway cooperating with the fixed portion 32 which forms a guide rail. The fixed portion 32 of the guide system is fixed relative to the non-movable elements of the nacelle and the propulsion unit. In the example, the fixed portion 32 is intended to be fastened to the fan casing of the turbojet engine associated to the nacelle. As shown in FIGS. 2a and 2b, the relative position of the fixed 32 and movable 30 portions of the guide system is related to the position of the movable cowl 20 and therefore of the thrust reverser cascades 22. This relative position has two extremes, corresponding to the retracted and deployed positions of the thrust reverser system. These two extreme positions are better shown in FIGS. 3a, 4a (retracted thrust reverser) and 3b, 4b (deployed thrust reverser). These figures show that, in accordance with the present disclosure, the length of the fixed portion 32 (or rail) engaged (in the forward position of the movable cowl 20) in the movable portion is larger than or equal to 50% (and in other forms, larger than or equal to 60% or larger than or equal to 80%) of the length of the movable portion 30 (or guideway), thus allowing a long type guidance. In the example, the length of the fixed portion 32 is equal to (or close to) the length of the movable portion 30. Advantageously, the length of the movable portion 30 is larger than the stroke of the movable cowl. Thus, when the movable cowl is in the rearward position, a portion of the fixed portion remains engaged in the movable portion. In this case, it will advantageously be possible to limit the length of the portion remaining engaged in the rearward position of the movable cowl, this being for example smaller than or equal to 20% of the length of the movable portion. Thus, the advantages of a "short" guidance, when the movable cowl is in the rearward position (reverse jet position), will be combined with the advantages of a "long" guidance when the movable cowl is in the forward position (direct jet position).

As shown in particular in FIGS. 3a, 3b, and 4a, 4b, the movable portion 30 of the guide system includes a body 300 which has a front portion 302, provided to be fastened to the front peripheral frame 26, for example by splicing, and a rear portion 304, provided to be fastened to the movable cowl 20, for example by riveting and/or splicing. In the example, the movable portion 30 is secured to a peripheral frame 202 of the movable cowl 20. The guide system 30 includes a longitudinal cavity shaped to receive the fixed portion 32.

Figure 5:
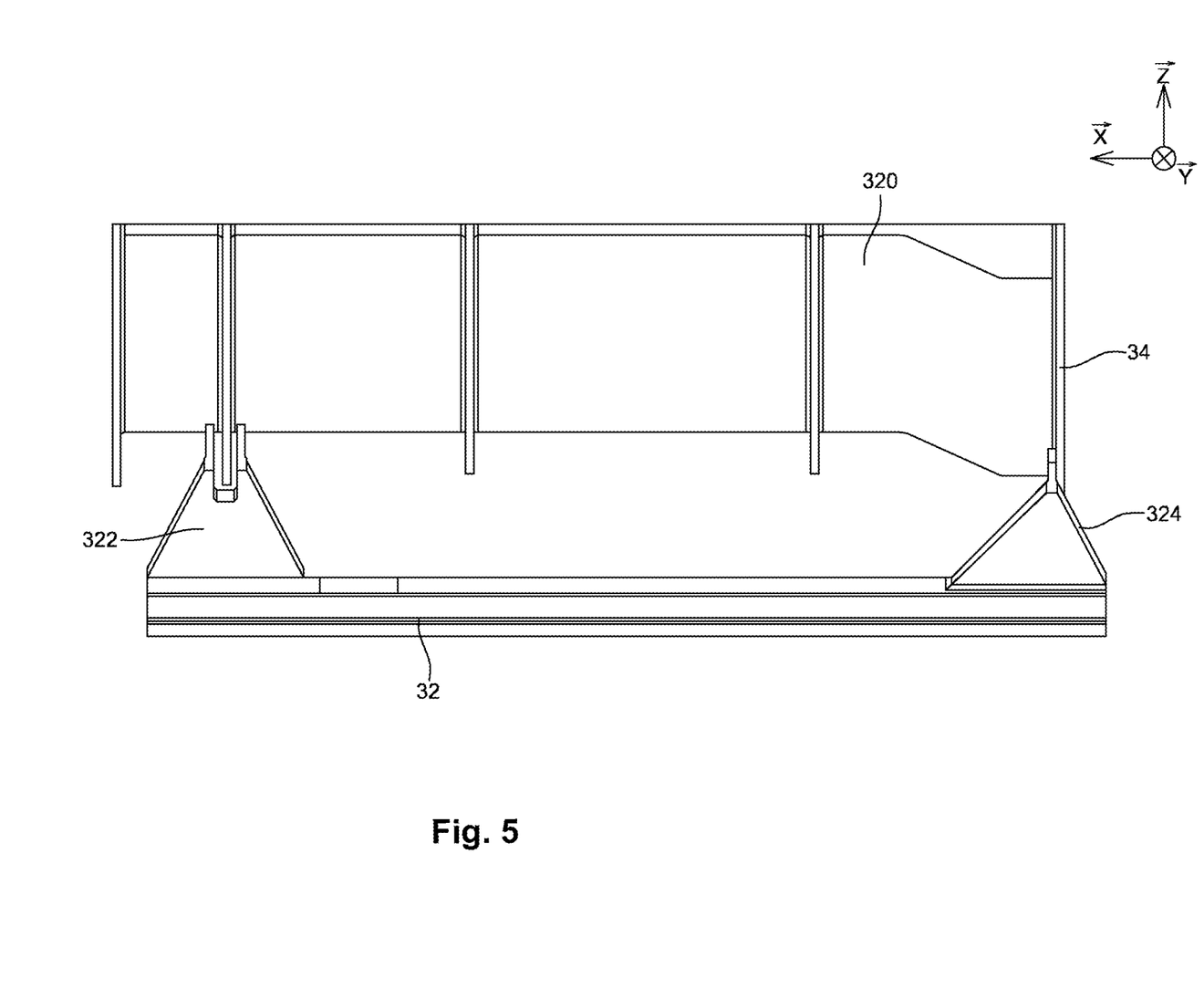
FIG. 5 represents a partial view of a turbojet engine in accordance with the present disclosure, showing one form of the fixed portion of the guide system, said fixed portion being fastened on the fan casing of the turbojet engine.

FIG. 5 shows an example of fastening the fixed portion 32 on a turbojet engine fan casing 320, the assembly being viewed from the side. In the example, the fixed portion 32 includes two remote fastening portions. The first fastening portion, or front fastening portion 322, allows fastening the fixed portion 32 directly to the fan casing 320, more specifically to a fastening flange of the fan casing. The second fastening portion, or rear fastening portion 324, allows fastening the fixed portion 32 to the intermediate casing shell 34, itself fastened to the fan casing 320. Advantageously, the rear fastening portion 324 will be integrally made in one-piece with the fixed portion 32, whereas the front fastening portion 322 will be attached.

In a variant which is not represented, the movable portion of the guide system could have, at the level of its rear portion, an extension extending in the form of a beam secured to the movable cowl 20. Thus, via this extension, the movable portion of the guide system will be securely fastened to the movable cowl 20 and will participate in the rigidity thereof.

In a variant which is not represented, it may be provided that it is the movable portion of the guide system which forms a guide rail whereas the fixed portion 32 forms a guideway cooperating with the guide rail.

Although the present disclosure has been described with reference to a particular form, it is obvious that it is not limited thereto and that it comprises all technical equivalents of the described means as well as the combinations thereof.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, manufacturing technology, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An aircraft turbojet engine nacelle comprising:
   a rear section without a lower bifurcation, the rear section including a thrust reverser system having a movable cowl; and
   a guide system including a movable portion and a fixed portion, the movable portion being secured in translation to the movable cowl and cooperating with the fixed portion, the fixed portion being fixed relative to the nacelle, the guide system being disposed at a 6 O'clock position,
   wherein the thrust reverser system includes thrust reverser cascades, the movable portion being disposed between adjacent two of the thrust reverser cascades and defining a cavity for receiving the fixed portion, the fixed portion being disposed on an inner side of the movable portion,
   wherein a length of the fixed portion of the guide system is larger than or equal to 50% of a length of the movable portion, and
   wherein, in a retracted position of the movable cowl, the length of the fixed portion is engaged between the adjacent two of the thrust reverser cascades, and
   in a deployed position of the movable cowl, a rear fastening end of the fixed portion is disposed upstream from said adjacent two of the thrust reverser cascades.

2. The nacelle according to claim 1, wherein the length of the fixed portion of the guide system is larger than or equal to 80% of the length of the movable portion.

3. The nacelle according to claim 1, wherein the fixed portion forms a rail cooperating with the movable portion, the movable portion forming a guideway and including the cavity adapted to receive the fixed portion.

4. The nacelle according to claim 1, wherein the fixed portion is secured to a peripheral frame fastened to a fan casing of a turbojet engine, or directly fastened to the fan casing.

5. The nacelle according to claim 4, wherein the fixed portion includes at least two fastening points.

6. The nacelle according to claim 1, wherein the thrust reverser cascades are sliding-type, and a front end of the movable portion is secured to a front peripheral frame secured to the thrust reverser cascades.

7. The nacelle according to claim 1, wherein a rear end of the movable portion is secured to a peripheral frame of the movable cowl.

8. An aircraft propulsion unit including a bypass turbojet engine, the aircraft propulsion unit comprising a nacelle according to claim 1.

9. The aircraft propulsion unit according to claim 8, wherein the fixed portion of the guide system is fastened to a fan casing.

10. An aircraft including at least one aircraft propulsion unit according to claim 8, the at least one aircraft propulsion unit being supported by a mast, the aircraft including guide rails for guiding the movable cowl of the nacelle, the guide rails being fastened on the mast or on a structure secured to at least one of the mast and the turbojet engine.

11. The nacelle according to claim 1, further comprising a front peripheral frame and an intermediate casing shell disposed downstream from the front peripheral frame, wherein the fixed portion is secured to the intermediate casing shell and the movable portion is secured to the front peripheral frame.

12. The nacelle according to claim 11, wherein the fixed portion has a front fastening portion secured to a fan casing and a rear fastening portion secured to the intermediate casing shell, and the movable portion has a front end secured to the front peripheral frame.

13. The aircraft turbojet engine nacelle according to claim 1, wherein the fixed portion includes a front fastening end fastened to a fan casing and the rear fastening end fastened to an intermediate casing shell disposed downstream from the fan casing.

14. The aircraft turbojet engine nacelle according to claim 13, wherein:
- the thrust reverser cascades have front ends fixed to a front peripheral frame;
- in the retracted position of the movable cowl, the front fastening end of the fixed portion is disposed proximate the front peripheral frame; and
- in the deployed position of the movable cowl, the rear fastening end of the fixed portion is disposed proximate the front peripheral frame.

* * * * *